(12) United States Patent
Zhang et al.

(10) Patent No.: US 11,392,822 B2
(45) Date of Patent: Jul. 19, 2022

(54) IMAGE PROCESSING METHOD, IMAGE PROCESSING APPARATUS, AND COMPUTER-READABLE STORAGE MEDIUM

(71) Applicant: MEGVII (BEIJING) TECHNOLOGY CO., LTD., Beijing (CN)

(72) Inventors: Xiangyu Zhang, Beijing (CN); Xinyu Zhou, Beijing (CN); Mengxiao Lin, Beijing (CN)

(73) Assignee: MEGVII (BEIJING) TECHNOLOGY CO., LTD., Beijing (CN)

(*) Notice: Subject to any disclaimer, the term of this patent is extended or adjusted under 35 U.S.C. 154(b) by 1051 days.

(21) Appl. No.: 16/026,898

(22) Filed: Jul. 3, 2018

(65) Prior Publication Data

US 2019/0311249 A1 Oct. 10, 2019

(30) Foreign Application Priority Data

Apr. 4, 2018 (CN) .......................... 201810301546.9

(51) Int. Cl.
| | | |
|---|---|---|
| *G06N 3/063* | (2006.01) | |
| *G06T 7/11* | (2017.01) | |
| *G06F 17/15* | (2006.01) | |
| *G06N 3/08* | (2006.01) | |
| *G06T 5/20* | (2006.01) | |
| *G06T 5/50* | (2006.01) | |

(52) U.S. Cl.
CPC .............. *G06N 3/063* (2013.01); *G06F 17/15* (2013.01); *G06N 3/08* (2013.01); *G06T 5/20* (2013.01); *G06T 5/50* (2013.01); *G06T 7/11* (2017.01)

(58) Field of Classification Search
CPC ...... G06F 17/15; G06N 3/0454; G06N 3/063; G06N 3/08; G06T 5/20; G06T 5/50; G06T 7/11
See application file for complete search history.

(56) References Cited

U.S. PATENT DOCUMENTS 9,436,895 B1 * 9/2016 Jones ...................... G06V 10/82
9,741,107 B2 * 8/2017 Xu ......................... G06T 7/0002
(Continued)

OTHER PUBLICATIONS

Zhang et al., "ShuffleNet: An Extremely Efficient Convolutional Neural Network for Mobile Devices", Cornell University Library (Computer Science, Computer Vision and Pattern Recognition), Jul. 4, 2017, 10 pages, and available at: https://arxiv.org/abs/1707.01083.

*Primary Examiner* — Peter D Le
(74) *Attorney, Agent, or Firm* — Hamre, Schumann, Mueller & Larson, P.C.

(57) ABSTRACT

Provided are image processing method and apparatus for processing an input image using a convolutional neural network system, and a computer-readable storage medium. The convolutional neural network system that includes an input layer, an intermediate layer and an output layer, the image processing method includes: receiving the input image via the input layer; extracting image features of the input image via the intermediate layer; and outputting processing results for the input image via the output layer, wherein the intermediate layer includes at least one network block each of which includes a first convolutional layer, a first grouping rearrangement layer and a second convolutional layer that are cascaded.

20 Claims, 11 Drawing Sheets

(56) References Cited

U.S. PATENT DOCUMENTS

| | | | | |
|---|---|---|---|---|
| 9,824,692 B1* | 11/2017 | Khoury | | G10L 17/18 |
| 10,185,891 B1* | 1/2019 | Martin | | G06V 10/82 |
| 10,402,699 B1* | 9/2019 | Chen | | G06T 7/277 |
| 10,769,758 B2* | 9/2020 | Zhang | | G06V 40/162 |
| 2014/0361983 A1* | 12/2014 | Dolfing | | G06V 30/32 |
| | | | | 345/156 |
| 2015/0036920 A1* | 2/2015 | Wu | | G06V 10/454 |
| | | | | 382/156 |
| 2015/0161522 A1* | 6/2015 | Saon | | G06N 3/08 |
| | | | | 706/12 |
| 2015/0309961 A1* | 10/2015 | Ozaki | | G06F 17/15 |
| | | | | 706/16 |
| 2016/0034788 A1* | 2/2016 | Lin | | G06T 7/33 |
| | | | | 382/157 |
| 2016/0035078 A1* | 2/2016 | Lin | | G06T 7/0002 |
| | | | | 382/157 |
| 2016/0086078 A1* | 3/2016 | Ji | | G06N 3/084 |
| | | | | 382/157 |
| 2016/0098844 A1* | 4/2016 | Shaji | | G06T 9/002 |
| | | | | 382/156 |
| 2016/0163035 A1* | 6/2016 | Chang | | G06N 3/0454 |
| | | | | 382/149 |
| 2016/0180162 A1* | 6/2016 | Cetintas | | G06F 16/58 |
| | | | | 706/20 |
| 2016/0307071 A1* | 10/2016 | Perronnin | | G06V 20/54 |
| 2016/0350645 A1* | 12/2016 | Brothers | | G06N 3/04 |
| 2016/0357748 A1* | 12/2016 | Hsiao | | G06N 3/08 |
| 2017/0083752 A1* | 3/2017 | Saberian | | G06N 3/0454 |
| 2017/0091951 A1* | 3/2017 | Yoo | | G06T 7/143 |
| 2017/0262750 A1* | 9/2017 | Kozuka | | G06N 3/08 |
| 2017/0300785 A1* | 10/2017 | Merhav | | G06F 17/11 |
| 2018/0129893 A1* | 5/2018 | Son | | G06K 9/6256 |
| 2018/0144209 A1* | 5/2018 | Kim | | G06V 10/462 |
| 2018/0197067 A1* | 7/2018 | Mody | | G06F 7/5443 |
| 2018/0260699 A1* | 9/2018 | Natroshvili | | G06N 20/10 |
| 2018/0336580 A1* | 11/2018 | Kato | | G06V 10/454 |
| 2018/0341829 A1* | 11/2018 | Kigawa | | G06N 3/08 |
| 2018/0350110 A1* | 12/2018 | Cho | | G06N 3/04 |
| 2019/0065896 A1* | 2/2019 | Lee | | G06N 3/04 |
| 2019/0065897 A1* | 2/2019 | Li | | G06K 9/6269 |

* cited by examiner

IMAGE PROCESSING METHOD, IMAGE PROCESSING APPARATUS, AND COMPUTER-READABLE STORAGE MEDIUM

CROSS-REFERENCE TO RELATED APPLICATION

This application claims priority to Chinese patent application No. 201810301546.9 filed on Apr. 4, 2018, the entire contents of which are incorporated herein by reference.

TECHNICAL FIELD

The present disclosure relates to the technical field of image processing, and more particularly, to an image processing method and apparatus for processing an input image using a convolutional neural network system, and a computer-readable storage medium.

BACKGROUND

Neural network is a large-scale multi-parameter optimized tool. With a large amount of training data, the neural network can learn some hidden features that are difficult to summarize in the data, thus completing many complex tasks, such as face detection, image semantic segmentation, object detection, motion tracking, and natural language translation. The neural network has been widely used in the artificial intelligence community.

In image processing applications such as modern deep visual recognition, the Convolutional Neural Network (CNN) model is at the core. However, the existing neural network models typically have hundreds of layers and thousands of channels, and are therefore associated with huge computational complexity (e.g., billions of floating point operations (FLOPs) per second or more), as a result, such convolutional neural network models can only be used for high-performance server clusters. Reducing the amount of computations by simply adjusting the number of network layers and channels may lead to serious degradation in accuracy. Therefore, the application of convolutional neural network models on mobile devices is limited.

SUMMARY

In view of the above problem, the present disclosure is proposed. The present disclosure provides an image processing method and apparatus for processing an input image using a convolutional neural network system, and a computer-readable storage medium.

According to an aspect of the present disclosure, there is provided an image processing method for processing an input image using a convolutional neural network system that includes an input layer, an intermediate layer and an output layer, the image processing method comprising: receiving the input image via the input layer; extracting image features of the input image via the intermediate layer; and outputting processing results for the input image via the output layer, wherein the intermediate layer includes at least one network block each of which includes a first convolutional layer, a first grouping rearrangement layer and a second convolutional layer that are cascaded, the first convolutional layer includes M filters that are divided into N first filter groups, the second convolutional layer includes P filters that are divided into Q second filter groups, the first convolutional layer receives N first feature map groups that include L first feature maps, the N first filter groups and the N first feature map groups correspond to each other one-to-one, each first filter group of the N first filter groups performs convolution on a corresponding one of the first feature map groups, and the first convolutional layer generates M second feature maps, the first grouping rearrangement layer divides the M second feature maps into Q second feature map groups each of which includes at least one of the second feature maps outputted by each first filter group of the N first filter groups, and the second convolutional layer receives the Q second feature map groups, the Q second filter groups and the Q second feature map groups correspond to each other one-to-one, and each second filter group of the Q second filter groups performs convolution on a corresponding one of the second feature map groups, and the second convolutional layer generates P third feature maps.

According to another aspect of the present disclosure, there is provided an image processing method for processing an input image using a convolutional neural network system that includes an input layer, an intermediate layer and an output layer, the image processing method comprising: receiving the input image via the input layer; extracting image features of the input image via the intermediate layer; and outputting processing results for the input image via the output layer, wherein the intermediate layer includes at least one network block each of which includes a first convolutional layer, a first grouping rearrangement layer and a second convolutional layer that are cascaded, each of the at least one network block includes a first convolutional layer, a second convolutional layer, a first grouping rearrangement layer and a third convolutional layer that are cascaded, the first convolutional layer includes M filters that are divided into N first filter groups, the first convolutional layer receives N first feature map groups that include L first feature maps, and the N first filter groups and the N first feature map groups correspond to each other one-to-one, and each first filter group of the N first filter groups performs convolution on a corresponding one of the first feature map groups, and the first convolutional layer generates M second feature maps that are divided into Q second feature map groups, the second convolutional layer includes P filters that are divided into Q second filter groups, and the second convolutional layer receives the Q second feature map groups, the Q second filter groups and the Q second feature map groups correspond to each other one-to-one, each second filter group of the Q second filter groups performs convolution on a corresponding one of the second feature map groups, the second convolutional layer generates P third feature maps, the first grouping rearrangement layer divides the P third feature maps into S third feature map groups, and each third feature map group of the S third feature map groups includes at least one of the third feature maps outputted by each second filter group of the Q second filter groups, the third convolutional layer includes R filters that are divided into S third filter groups, and the third convolutional layer receives the S third feature map groups, the S third filter groups and the S third feature map groups correspond to each other one-to-one, and each third filter group of the S third filter groups performs convolution on a corresponding one of the third feature map groups, the third convolutional layer generates R fourth feature maps.

According to still another aspect of the present disclosure, there is provided an image processing apparatus for processing an input image using a convolutional neural network system that includes an input layer, an intermediate layer and an output layer, the image processing apparatus comprising: an image input unit configured to receive the input image via the input layer; an image feature extraction unit configured to extract image features of the input image via the intermediate layer; and a processing result output unit configured to output processing results for the input image via the output layer, wherein the intermediate layer includes at least one network block each of which includes a first convolutional layer, a first grouping rearrangement layer and a second convolutional layer that are cascaded, the first convolutional layer includes M filters that are divided into N first filter groups, the second convolutional layer includes P filters that are divided into Q second filter groups, the first convolutional layer receives N first feature map groups that include L first feature maps, the N first filter groups and the N first feature map groups correspond to each other one-to-one, each first filter group of the N first filter groups performs convolution on a corresponding one of the first feature map groups, and the first convolutional layer generates M second feature maps, the first grouping rearrangement layer divides the M second feature maps into Q second feature map groups each of which includes at least one of the second feature maps outputted by each first filter group of the N first filter groups, and the second convolutional layer receives the Q second feature map groups, the Q second filter groups and the Q second feature map groups correspond to each other one-to-one, and each second filter group of the Q second filter groups performs convolution on a corresponding one of the second feature map groups, and the second convolutional layer generates P third feature maps.

According to still another aspect of the present disclosure, there is provided an image processing apparatus for processing an input image using a convolutional neural network system that includes an input layer, an intermediate layer and an output layer, the image processing apparatus comprising: an image input unit configured to receive the input image via the input layer; an image feature extraction unit configured to extract image features of the input image via the intermediate layer; and a processing result output unit configured to output processing results for the input image via the output layer, wherein the intermediate layer includes at least one network block each of which includes a first convolutional layer, a first grouping rearrangement layer and a second convolutional layer that are cascaded, each of the at least one network block includes a first convolutional layer, a second convolutional layer, a first grouping rearrangement layer and a third convolutional layer that are cascaded, the first convolutional layer includes M filters that are divided into N first filter groups, the first convolutional layer receives N first feature map groups that include L first feature maps, and the N first filter groups and the N first feature map groups correspond to each other one-to-one, and each first filter group of the N first filter groups performs convolution on a corresponding one of the first feature map groups, and the first convolutional layer generates M second feature maps that are divided into Q second feature map groups, the second convolutional layer includes P filters that are divided into Q second filter groups, and the second convolutional layer receives the Q second feature map groups, the Q second filter groups and the Q second feature map groups correspond to each other one-to-one, each second filter group of the Q second filter groups performs convolution on a corresponding one of the second feature map groups, the second convolutional layer generates P third feature maps, the first grouping rearrangement layer divides the P third feature maps into S third feature map groups, and each third feature map group of the S third feature map groups includes at least one of the third feature map outputted by each second filter group of the Q second filter groups, the third convolutional layer includes R filters that are divided into S third filter groups, and the third convolutional layer receives the S third feature map groups, the S third filter groups and the S third feature map groups correspond to each other one-to-one, and each third filter group of the S third filter groups performs convolution on a corresponding one of the third feature map groups, the third convolutional layer generates R fourth feature maps.

According to still another aspect of the present disclosure, there is provided an image processing apparatus, comprising: a memory configured to store computer-readable instructions; and a processor configured to execute the computer-readable instructions to cause the image processing apparatus to perform the image processing method described above.

According to still another aspect of the present disclosure, there is provided a computer-readable storage medium for storing computer-readable instructions capable of, when being executed by a computer, causing the computer to perform the image processing method described above. For example, the computer-readable storage medium is a non-transient computer-readable storage medium.

As will be described in detail below, the image processing method and apparatus for processing an input image using a convolutional neural network system according to the embodiments of the present disclosure decompose an ordinary convolutional operation into grouped pointwise convolution and channel-by-channel convolution, introduce a mechanism of information exchange between groups while performing grouped group-by-point convolution, thereby a convolutional neural network model suitable for computing capability of mobile terminals are realized, high representation ability and high recognition accuracy of the convolutional neural network model are maintained.

It is to be understood that both the foregoing general descriptions and the following detailed descriptions are exemplary and intended to provide further explanations of the claimed technique.

BRIEF DESCRIPTION OF THE DRAWINGS

Through the more detailed descriptions of embodiments of the present disclosure that are provided with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are part of the embodiments of the present disclosure, rather than all of the embodiments of the present disclosure, it should be understood that the present disclosure is not limited to the exemplary embodiments described herein.

The present disclosure relates to an image processing method and apparatus for processing an input image using a convolutional neural network system. Usually, the image processing method using neural network can be divided into two phases, namely, a training phase and an image processing phase. The so-called training phase refers to that first it needs to use training images to train the neural network, so as to adjust weights (also referred to as parameters) of the neural network; the so-called image processing phase refers to that features of an image to be processed are extracted by using the trained neural network afterwards, and image target determination, classification and other processing are carried out in the image. In the present disclosure, for the convolutional neural network model to be applied to mobile device terminals having millions to tens of millions of floating point operations (FLOPs) per second, the respective embodiments decompose an ordinary convolutional operation into grouped pointwise convolution and channel-by-channel convolution, introduce a mechanism of information exchange between groups while performing grouped pointwise convolution. Hereinafter, various embodiments of the present disclosure will be described in detail with reference to the accompanying drawings.

Figure 1:
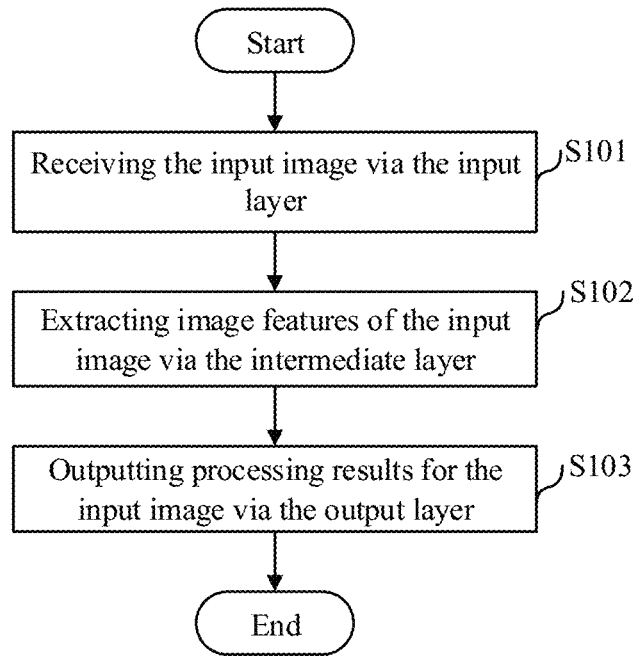
FIG. 1 is a flowchart illustrating an image processing method according to an embodiment of the present disclosure.

First, an image processing method according to an embodiment of the present disclosure is described with reference to FIGS. 1 and 2. FIG. 1 is a flowchart illustrating an image processing method according to an embodiment of the present disclosure, and FIG. 2 is a schematic diagram illustrating an image processing method according to an embodiment of the present disclosure.

Figure 2:
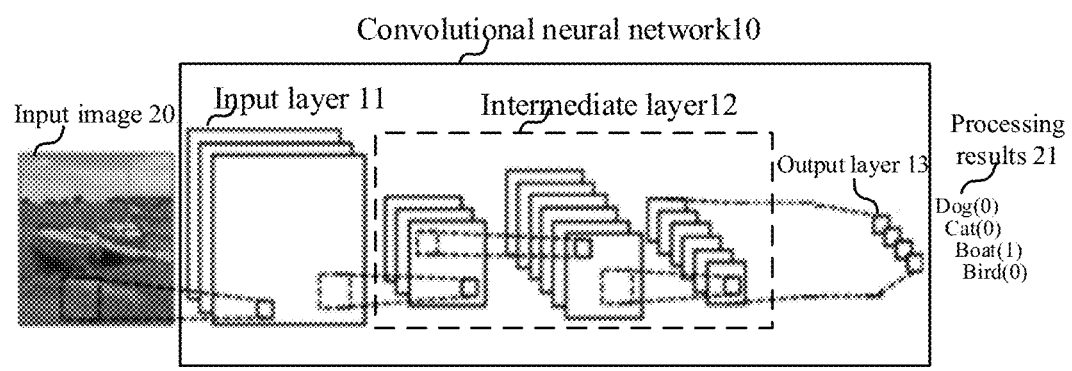
FIG. 2 is a schematic diagram illustrating an image processing method according to an embodiment of the present disclosure.

As shown in FIGS. 1 and 2, in step S101, an input image 20 is received via an input layer 11. As schematically shown in FIG. 2, a convolutional neural network 10 in an embodiment of the present disclosure includes an input layer 11, an intermediate layer 12 and an output layer 13.

In step S102, image features of the input image 20 are extracted via the intermediate layer 12. As schematically shown in FIG. 2, the intermediate layer 12 may include a plurality of cascaded sub-layers, including but not limited to a convolutional layer, a pooling layer, an activation layer, and the like. In an embodiment according to the present disclosure that will be described in detail below, the intermediate layer 12 includes at least one network block, where each network block may include, for example, one or more convolutional layers of the plurality of cascaded sub-layers.

In step S103, processing results 21 for the input image are outputted via the output layer 21. Exemplarily, the processing results may be classified results. As schematically shown in FIG. 2, the output layer 13 outputs the classified results 21 after processing such as global pooling, full connection, and the like have been performed. The image processing method according to an embodiment of the present disclosure is not limited to performing target classification in an image, but also includes detection, segmentation of a target object, motion prediction of a target object, similarity comparison of a target object, and the like. Exemplarily, the processing results outputted via the output layer of the neural network system may also be position information of the target object, image segmentation results, motion prediction results of a target object, similarity of a target object, and the like.

As described above, in the image processing method according to the embodiments of the present disclosure, an ordinary convolutional operation is decomposed into grouped pointwise convolution and channel-by-channel convolution, a mechanism of information exchange between groups is introduced while grouped point-by-point convolution is performed. Hereinafter, a network block to which grouped pointwise convolution and channel-by-channel convolution are applied in an image processing method according to an embodiment of the present disclosure will be described in further detail with reference to the accompanying drawings.

Figure 3A:
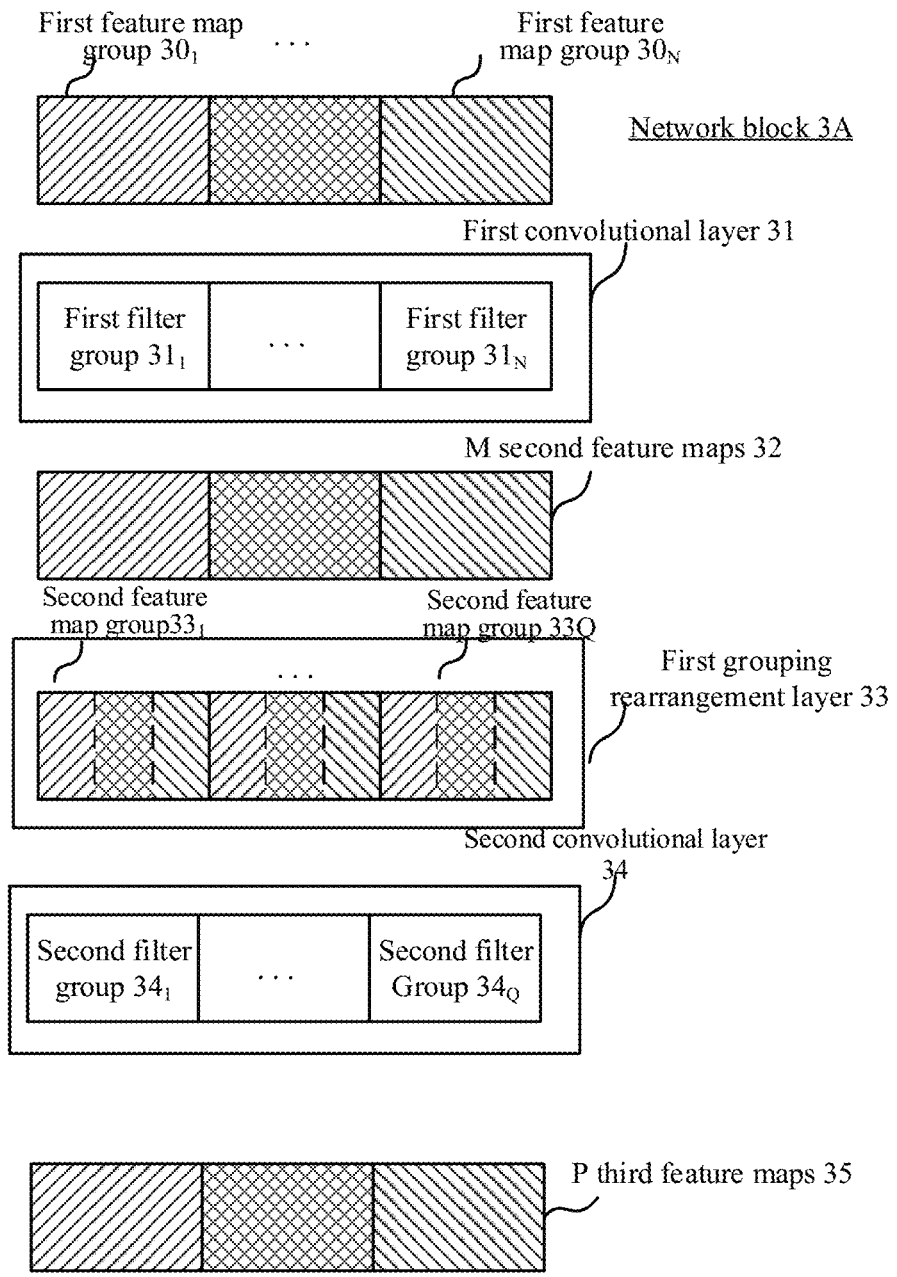
FIGS. 3A and 3B are schematic diagrams illustrating a first network block of a convolutional neural network according to an embodiment of the present disclosure.
Figure 3B:
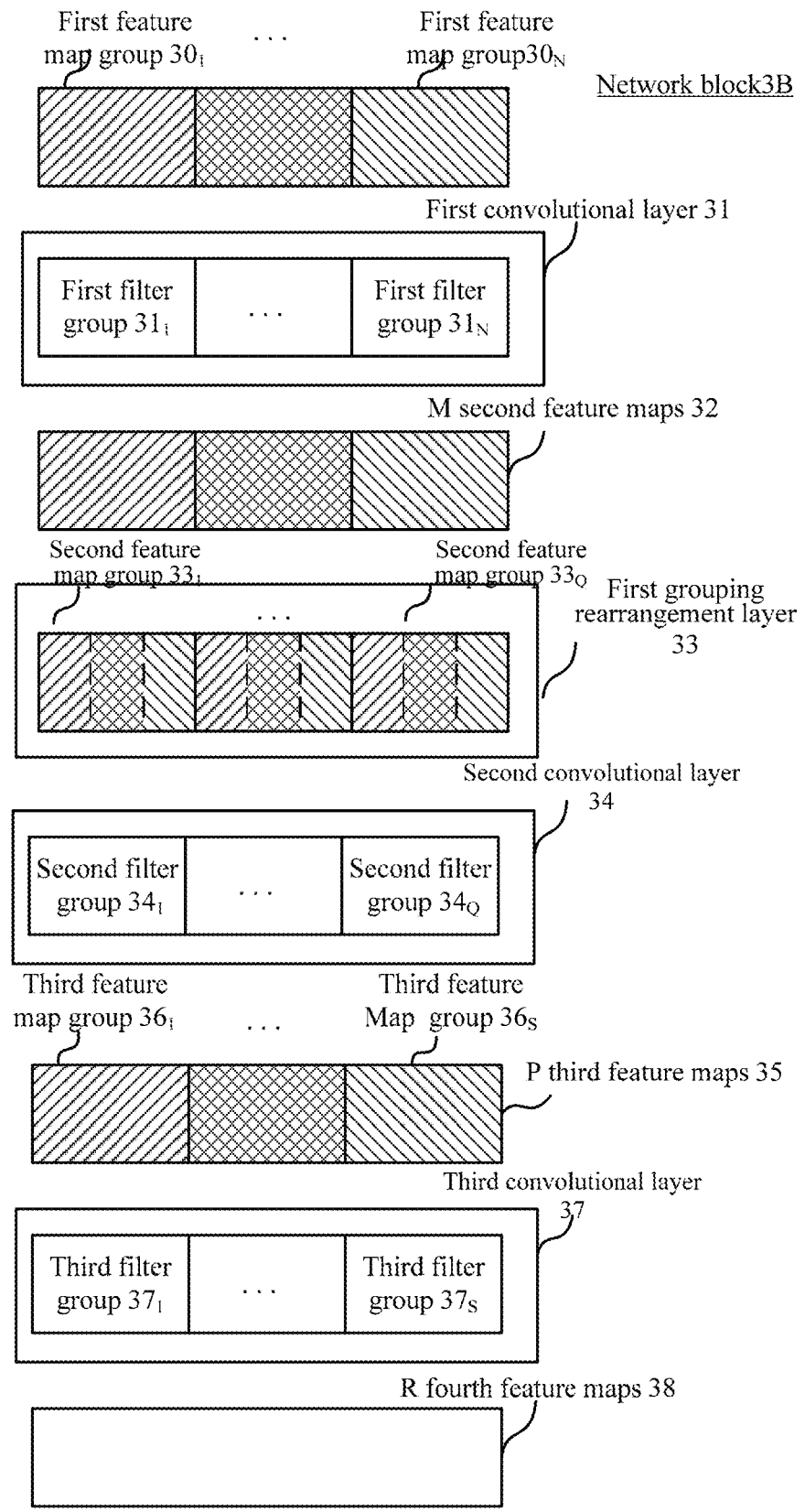

In some embodiments, the intermediate layer 12 described with reference to FIG. 2 includes at least one first network block. FIGS. 3A and 3B are schematic diagrams illustrating a first network block of a convolutional neural network according to an embodiment of the present disclosure. Grouping rearrangement operation in the network block will be described with reference to FIGS. 3A and 3B.

Schematically, the intermediate layer 12 described with reference to FIG. 2 includes at least one first network block 3A. The network block 3A includes a first convolutional layer 31, a first grouping rearrangement layer 33 and a second convolutional layer 34 that are cascaded. The first convolutional layer 31 includes M filters that are divided into N first filter groups $31_1$ to $31_N$, the second convolutional layer 34 includes P filters that are divided into Q second filter groups $34_1$ to $34_Q$.

As shown in FIG. 3A, the first convolutional layer 31 receives N first feature map groups $31_1$ to $31_N$ (filled with different line types in FIG. 3A), the N first feature map groups $30_1$ to $30_N$ include L first feature maps, and each of the L first feature maps represents an output feature from a corresponding channel of an upper layer, the N first filter groups $31_1$ to $31_N$ and the N first feature map groups $31_1$ to $31_N$ correspond to each other one-to-one. Each filter group of the N first filter groups $31_1$ to $31_N$ performs convolution on a corresponding one of the first feature map groups $31_1$ to $31_N$. For example, each filter in the first filter group $31_1$ performs convolution only on the input feature map in the first feature map group $30_1$ without performing convolution on the input feature maps in the other first feature map groups $30_2$ to $30_N$, therefore, computational overhead of the first convolutional layer 31 is significantly reduced.

The M filters of the first convolutional layer 31 generate M second feature maps 32. As shown in FIG. 3A, since each filter in the first filter group $31_1$ performs convolution only on the input feature map in the first feature map group $30_1$, the second feature map 32 generated by each first filter group only involves channel information of one from among the first feature map groups $31_1$ to $31_N$. When the first convolutional layer 31 continues to be stacked with the other convolutional layers afterwards, this will cause information flow of the convolutional neural network model to be partitioned within respective filter groups, and there is no information exchange between groups, thereby representation capability and recognition accuracy of the entire convolutional neural network model are affected.

Accordingly, while adopting grouped convolution, the network block 3A according to an embodiment of the present disclosure further comprises the first grouping rearrangement layer 33. The first grouping rearrangement layer 33 divides the M second feature maps from the first convolutional layer 31 into Q second feature map groups $33_1$ to $33_Q$ each of which includes at least one of the second feature maps outputted by each first filter group of the N first filter groups $31_1$ to $31_N$. For example, as shown in FIG. 3A, the second feature map group $33_1$ includes at least one of the second feature maps outputted by each first filter group of the N first filter groups $31_1$ to $31_N$. In an embodiment of the present application, the first grouping rearrangement layer 33 divides the M second feature maps equally into the Q second feature maps groups $33_1$ to $33_Q$. In another embodiment of the present disclosure, the first grouping rearrangement layer 33 divides the M second feature maps into the Q second feature map groups $33_1$ to $33_Q$ each of which may include different numbers of second feature maps.

Thereafter, the second convolutional layer 34 receives the Q second feature map groups $33_1$ to $33_Q$, the Q second filter groups $34_1$ to $34_Q$ and the Q second feature map groups $33_1$ to $33_Q$ correspond to each other one-to-one, and each second filter group of the Q second filter groups performs convolution on a corresponding one of the second feature map groups $33_1$ to $33_Q$, and the second convolutional layer 34 generates P third feature maps 35.

Exemplarily, the intermediate layer 12 described with reference to FIG. 2 includes at least one network block 3B. The network block 3B further illustrated in FIG. 3B has a third convolutional layer 37 cascaded on the second convolutional layer 34. Similar to operations of the first convolutional layer 31, the third convolutional layer 37 includes R filters that are divided into S third filter groups $37_1$ to $37_S$, the third convolutional layer 37 receives S third feature map groups $36_1$ to $36_S$ that include the P third feature maps 35, the S third filter groups $37_1$ to $37_S$ and the S third feature map groups $36_1$ to $36_S$ correspond to each other one-to-one, and each third filter group of the S third filter groups $37_1$ to $37_S$ performs convolution on a corresponding one of the third feature map groups $36_1$ to $36_S$, and the third convolutional layer 37 generates R fourth feature maps 38.

In addition, it is easy to understand that a second grouping rearrangement layer 34 may also be disposed between the second convolutional layer 34 and the third convolutional layer 37 according to requirements of calculation capability and recognition accuracy, so grouping rearrangement of feature maps is performed before the P third feature maps 35 generated by the second convolutional layer 34 are inputted into the third convolutional layer 37, thus each third feature map group of the S third feature map groups $36_1$ to $36_S$ includes at least one of the third feature maps outputted by each second filter group of the Q second filter groups $34_1$ to $34_Q$. Similarly, a second grouping rearrangement layer may be disposed after the third convolutional layer 37 to divide the R fourth feature maps into T fourth feature map groups for a subsequent cascaded convolutional layer to perform grouped convolution.

In the network blocks 3A and 3B described above with reference to FIGS. 3A and 3B, feature information exchange among groups is realized by introducing the grouping rearrangement layer, and representation capability and recognition accuracy of the convolutional neural network model for performing grouped convolution are improved.

Figure 4A:
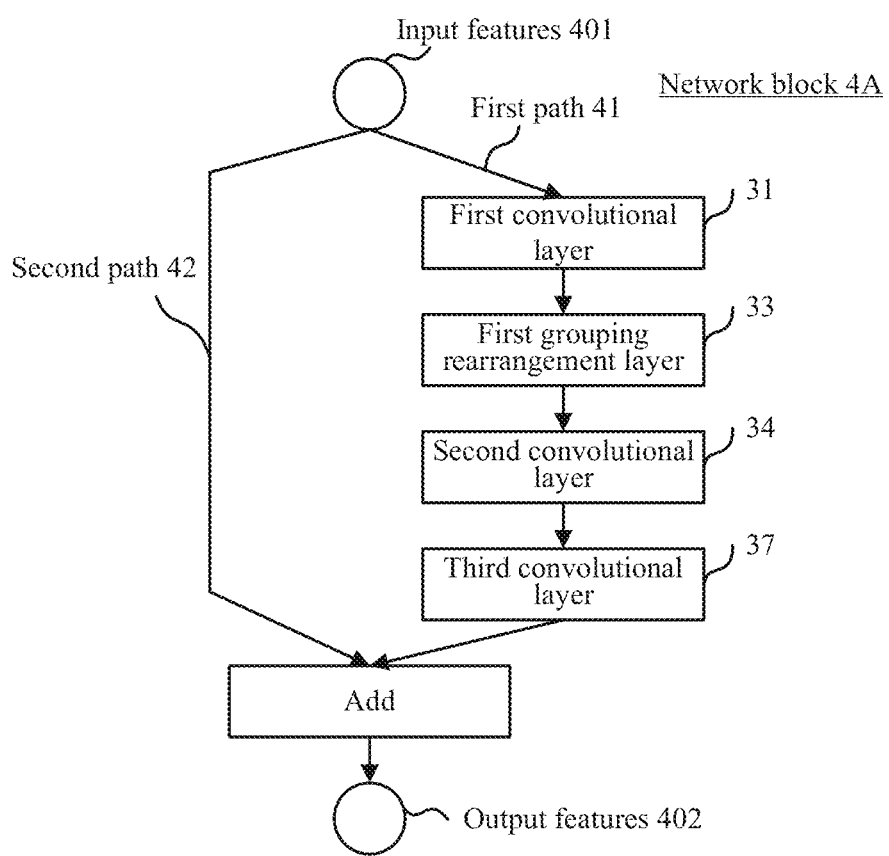
FIGS. 4A and 4B are schematic diagrams illustrating a second network block of a convolutional neural network according to an embodiment of the present disclosure.
Figure 4B:
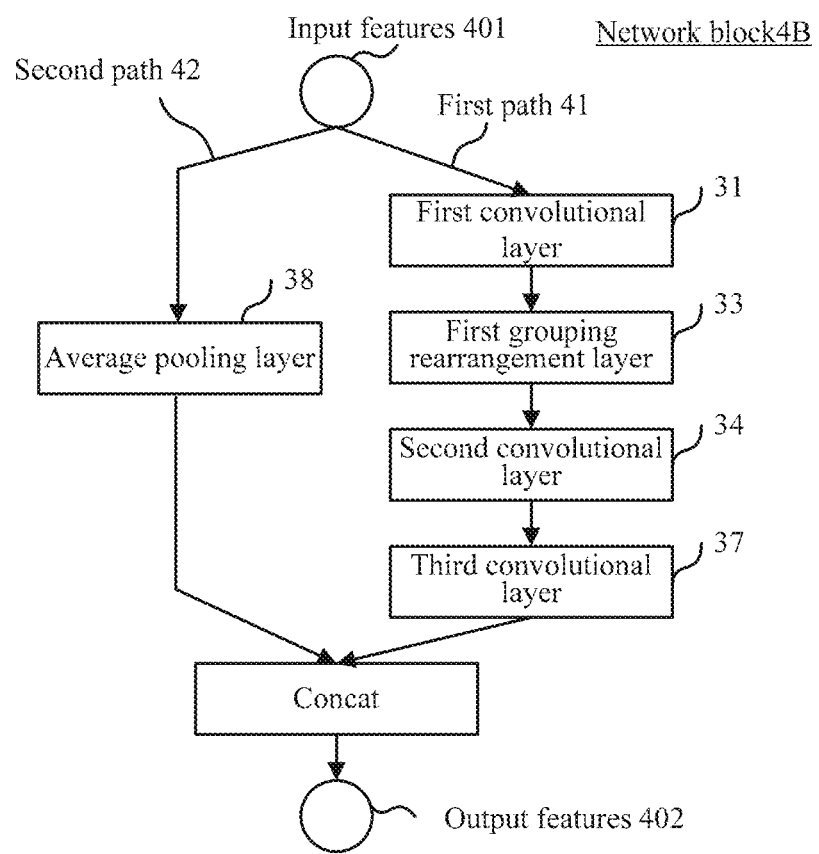

In some embodiments, the intermediate layer 12 described with reference to FIG. 2 includes at least one second network block. FIGS. 4A and 4B are schematic diagrams illustrating a second network block of a convolutional neural network according to an embodiment of the present disclosure. The network blocks 4A and 4B shown in FIGS. 4A and 4B include the first convolutional layer 31, the first grouping rearrangement layer 33, the second convolutional layer 34 and the third convolutional Layer 37 described above with reference to FIGS. 3A and 3B.

Exemplarily, the intermediate layer 12 described with reference to FIG. 2 includes at least one network block 4A. The network 4A shown in FIG. 4A includes a first path 41 and a second path 42, the first path 41 includes the first convolutional layer 31, the first grouping rearrangement layer 33, the second convolutional layer 34 and the third convolutional layer 37 that are cascaded, the second path 42 is a path for linking input features 401 of the first convolutional layer 31 in the first path 41 and output features of the last convolutional layer 37 in the first path 41. Exemplarily, the second path may also be referred to as a skip-connection or a shortcut connection. The first convolutional layer 31, the first grouping rearrangement layer 33, the second convolutional layer 34, and the third convolutional layer 37 have been described above with reference to FIGS. 3A and 3B. Exemplarily, a convolutional kernel size of each filter in the first convolutional layer 31 is 1×1, a convolutional kernel size of each filter in the second convolutional layer 34 is 3×3, and each filter in the second convolutional layer 34 performs convolution with a step size of one on a second feature map of one channel in one corresponding second feature map group among the Q second feature map groups, so as to generate the P third feature maps. A convolutional kernel size of each filter in the S third filter groups in the third convolutional layer 37 is 1×1. The input features 401 and the output features of the first path are added to serve as output features of the network block 4A.

Exemplarily, the intermediate layer 12 described with reference to FIG. 2 includes at least one network block 4B. Compared with the network block 4A shown in FIG. 4A, the network block 4B shown in FIG. 4B further includes an average pooling layer 38 disposed in the second path 42. Exemplarily, a convolutional kernel size of each filter in the first convolutional layer 31 is 1×1, a convolutional kernel size of each filter in the second convolutional layer 34 is 3×3, and each filter in the second convolutional layer 34 performs convolution with a step size of t (t is an integer greater than one) on a second feature map of one channel in one corresponding second feature map group among the Q second feature map groups, so as to generate the P third feature maps. Correspondingly, a size of an average pooling layer is u×u (u is an integer greater than one), and the average pooling layer performs an average pooling with a step length of t on the input features, and generates pooled input features. That is, by introducing convolution having a step length in the second convolutional layer 34 and disposing the average pooling layer 38 that performs pooling with the same length in the second path 42, down-sampling of feature maps is realized. Thereafter, the pooled input features and the output features of the first path are concatenated in a channel dimension as output features of the network block 4B, thereby the input features 401 and the output features 402 maintain the same dimensions.

As described above, in the network blocks 4A and 4B shown in FIGS. 4A and 4B, the second convolutional layer 34 performs channel-by-channel convolution, thereby reducing complexity at which convolutional operations of the second convolutional layer 34 extract spatial features. In addition, two 1×1 pointwise convolutions of the first convolutional layer 31 and the third convolutional layer 37 are grouped and a grouping rearrangement operation is added, cross-channel calculation amount of the convolutional operations is further reduced, meanwhile feature representation capability of the network blocks 4A and 4B is also maintained.

Figure 5:
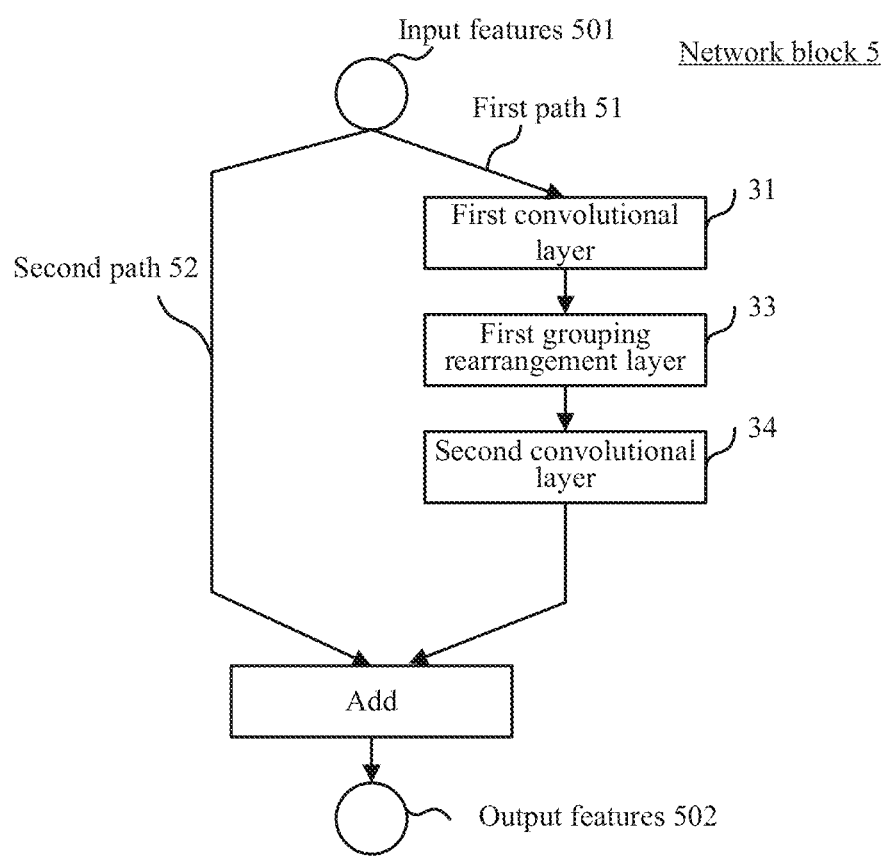
FIG. 5 is a schematic diagram illustrating a third network block of a convolutional neural network according to an embodiment of the present disclosure.

In some embodiments, the intermediate layer 12 described with reference to FIG. 2 includes at least one third network block. FIG. 5 is a schematic diagram illustrating a third network block of a convolutional neural network according to an embodiment of the present disclosure. The network block 5 shown in FIG. 5 includes the first convolutional layer 31, the first grouping rearrangement layer 33, and the second convolution layer 34 described above with reference to FIGS. 3A and 3B.

Similar to the network blocks 4A and 4B in FIGS. 4A and 4B, the network block 5 shown in FIG. 5 includes a first path 51 and a second path 52, the first path 51 includes the first convolutional layer 31, the first grouping rearrangement layer 33 and the second convolutional layer 34 that are cascaded, the second path 52 is a path for linking input features 501 of the first convolutional layer 31 in the first path 51 and output features of the last convolutional layer 34 in the first path 51.

A convolutional kernel size of each filter in the first convolutional layer 31 is 1×n, and a convolutional kernel size of each filter in the second convolutional layer is n×1; or, a convolutional kernel size of each filter in the first convolutional layer 31 is n×1, and a convolutional kernel size of each filter in the second convolutional layer 34 is 1×n. The input features 501 are the N first feature map groups, and the output features of the first path 51 are the P third feature maps generated by the second convolutional layer 34. The input features 501 and the output features (i.e., the P third feature maps) of the first path are added to serve as the output features of the network block 5.

As described above, in the network block 5 shown in FIG. 5, the convolutional layer that performs channel-by-channel convolution in FIGS. 4A and 4B is unnecessary, instead convolutional kernel sizes of the first convolutional layer 31 and the second convolutional layer 34 are made 1×n and n×1, and grouping convolution which adds a grouping rearrangement operation is performed, cross-channel calculation amount of the convolutional operations is reduced, meanwhile feature representation capability of the network block 5 is also maintained.

Figure 6:
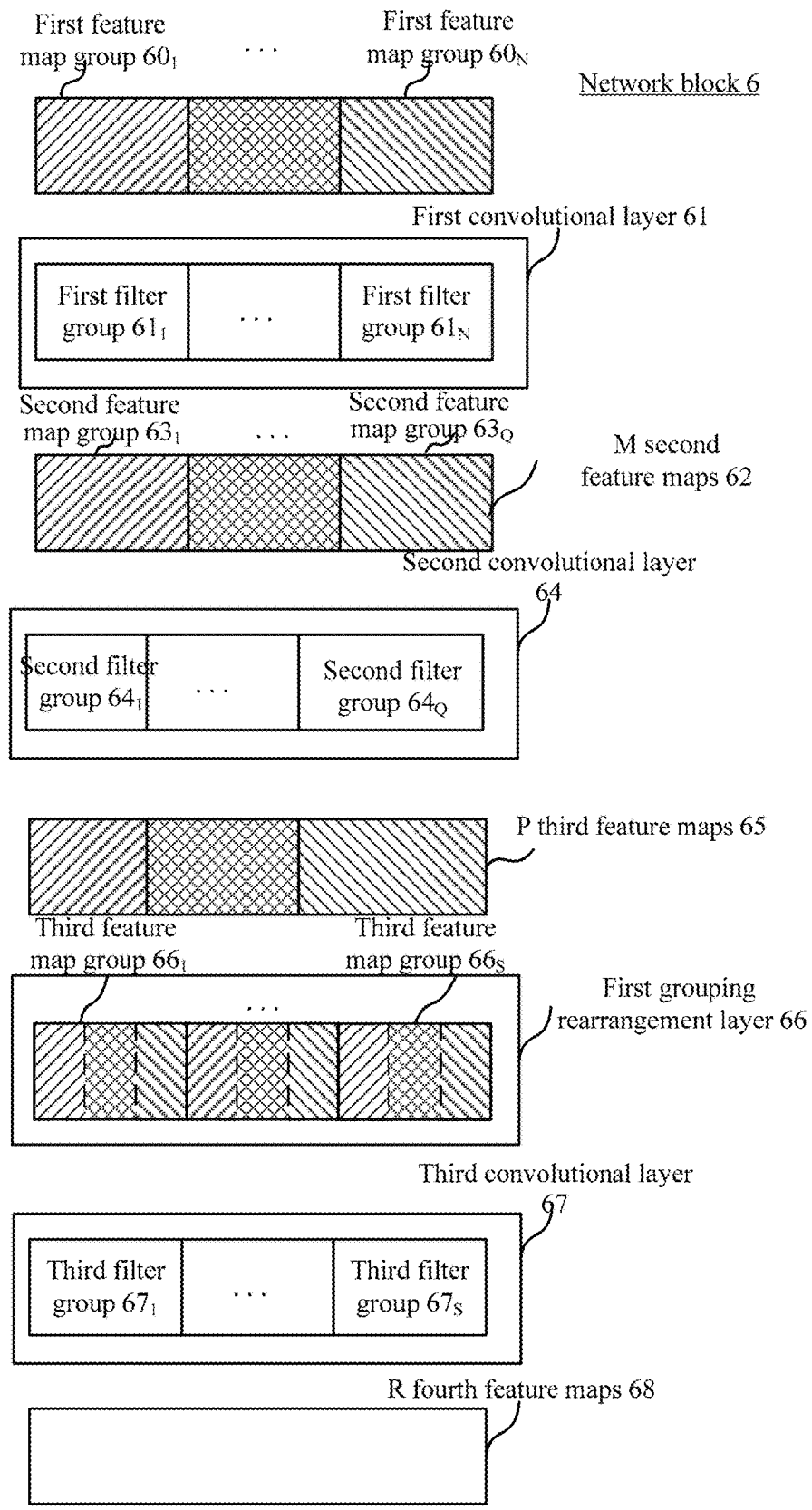
FIG. 6 is a schematic diagram illustrating a fourth network block of a convolutional neural network according to an embodiment of the present disclosure.

In some embodiments, the intermediate layer 12 described with reference to FIG. 2 includes at least one fourth network block. FIG. 6 is a schematic diagram illustrating a fourth network block of a convolutional neural network according to an embodiment of the present disclosure. The network block 6 shown in FIG. 6 includes a first convolutional layer 61, a second convolutional layer 64, a first grouping rearrangement layer 66 and a third convolutional layer 67 that are cascaded. That is, unlike the first grouping rearrangement layer 33 disposed after the first convolutional layer 31 in the network block 3B described above with reference to FIG. 3B, the first grouping rearrangement layer 66 in the network block 6 is disposed after the second convolutional layer 64.

Specifically, the first convolutional layer 61 receives N first feature map groups $61_1$ to $61_N$ (filled with different line types in FIG. 6), the N first feature map groups $60_1$ to $60_N$ include L first feature maps, and each of the L first feature maps represents an output feature from a corresponding channel of an upper layer, the N first filter groups $61_1$ to $61_N$ and the N first feature map groups $61_1$ to $61_N$ correspond to each other one-to-one. Each first filter group of the N first filter groups $61_1$ to $61_N$ performs convolution on a corresponding one of the first feature map groups $61_1$ to $61_N$. For example, each filter in the first filter group $61_1$ performs convolution only on the input feature map in the first feature map group $60_1$ without performing convolution on the input feature maps in the other first feature map groups $60_2$ to $60_N$, therefore computational overhead of the first convolutional layer 61 is significantly reduced.

The M filters of the first convolutional layer 61 generate M second feature maps 62, the M second feature maps 62 are divided into Q second feature map groups $63_1$ to $63_Q$. The second convolutional layer 64 includes P filters that are divided into Q second filter groups $64_1$ to $64_Q$, the second convolutional layer 64 receives the Q second feature map groups, the Q second filter groups $64_1$ to $64_Q$ and the Q second feature map groups $63_1$ to $63_Q$ correspond to each other one-to-one, each second filter group of the Q second filter groups $64_1$ to $64_Q$ performs convolution on a corresponding one of the second feature map groups $63_1$ to $63_Q$, the second convolutional layer generates P third feature maps 65.

In an embodiment of the present disclosure, convolutional kernel sizes of the filters in the same group in the second convolutional layer are the same, and convolutional kernel sizes of the filters in different groups in the second convolutional layer are different. For example, as shown in FIG. 6, convolutional kernel sizes of the filters in the second filter group $64_1$ have the same size, and convolution kernel sizes of the filters in the second filter group $64_1$ are different from convolution kernel sizes of the filters in the second filter group $64_Q$. That is, by configuring filters in different groups in the second convolution layer 64 to have different convolutional kernel sizes, it is achieved that different second filter groups have different receptive field sizes. In other words, different second filter groups provide different feature information representation capabilities.

While using grouping convolution and configuring different grouping convolutions to have different receptive fields, the network block 6 according to an embodiment of the present disclosure further includes the first grouping rearrangement layer 66. The first grouping rearrangement layer 66 divides the P third feature maps 65 from the second convolutional layer 64 into S third feature map groups $66_1$ to $66_S$, and each third feature map group of the S third feature map groups $66_1$ to $66_S$ includes at least one of the third feature maps outputted by each second filter group of the Q second filter groups $64_1$ to $64_Q$. For example, as shown in FIG. 6, the third feature map group $66_1$ includes at least one of the third feature maps outputted by each second filter group of the second filter groups $64_1$ to $64_Q$. In an embodiment of the present application, the first grouping rearrangement layer 66 divides the P third feature maps 65 equally into the S third feature maps groups $66_1$ to $66_S$. In another embodiment of the present disclosure, the first grouping rearrangement layer 66 divides the P third feature maps into the S third feature maps groups $66_1$ to $66_S$ each of which may include different numbers of third feature maps.

Thereafter, the third convolutional layer 67 receives the S third feature map groups $66_1$ to $66_S$, the S third filter groups $67_1$ to $67_S$ and the S third feature map groups $66_1$ to $66_S$ correspond to each other one-to-one, and each third filter group of the S third filter groups $67_1$ to $67_S$ performs convolution on a corresponding one of the third feature map groups $66_1$ to $66_S$, the third convolutional layer 67 generates R fourth feature maps 68.

In the network block 6 described above with reference to FIG. 6, by introducing different filters with different convolutional kernel sizes in different groups, it is achieved that different groups have different receptive field sizes, and the grouping rearrangement layer implements information exchange between respective groups having different receptive field sizes, therefore presentation capability and recognition accuracy of the convolutional neural network model that performs grouped convolution are improved.

Figure 7:
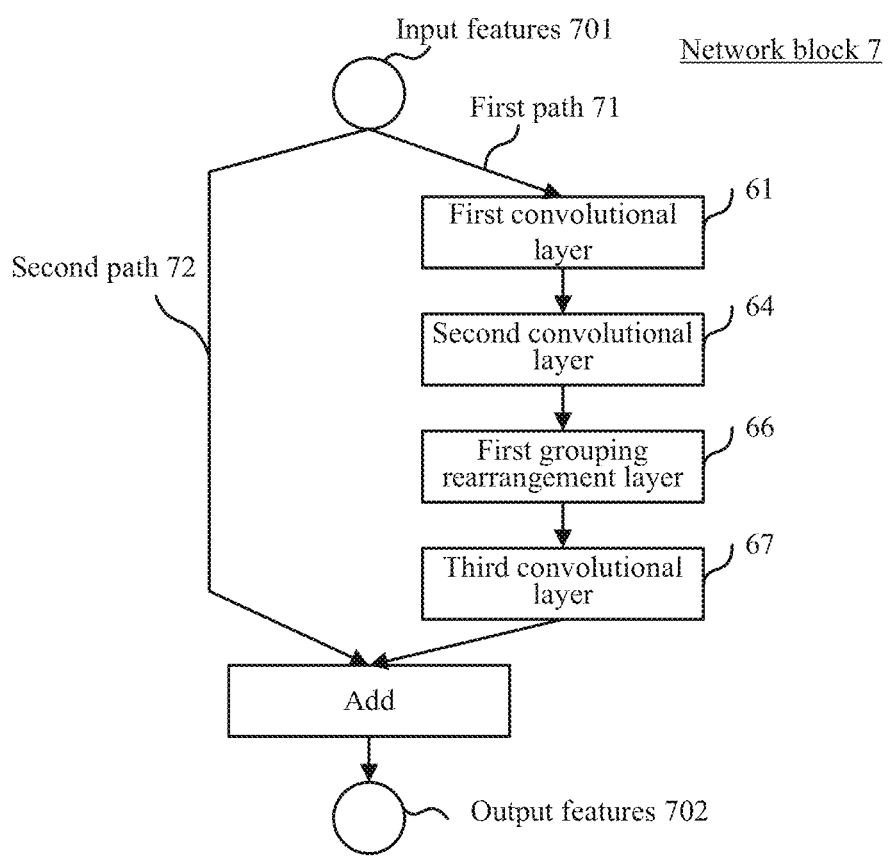
FIG. 7 is a schematic diagram illustrating a fifth network block of a convolutional neural network according to an embodiment of the present disclosure.

In some embodiments, the intermediate layer 12 described with reference to FIG. 2 includes at least one fifth network block. FIG. 7 is a schematic diagram illustrating a fifth network block of a convolutional neural network according to an embodiment of the present disclosure. The network block 7 shown in FIG. 7 includes the first convolutional layer 61, the second convolutional layer 64, the first grouping rearrangement layer 66, and the third convolutional layer 67 described above with reference to FIG. 6.

Similar to the network blocks described above with reference to FIGS. 4A, 4B and 5, the network block 7 includes a first path 71 and a second path 72, the first path includes the first convolutional layer 61, the second convolutional layer 64, the first grouping rearrangement layer 66 and the third convolutional layer 67 that are cascaded, the second path 72 is a path for linking input features of the first convolutional layer 61 in the first path 71 and output features of the last convolutional layer 67 in the first path 71.

The first convolutional layer 61, the second convolutional layer 64, the first grouping rearrangement layer 66 and the third convolutional layer 67 have been described above with reference to FIG. 6. Exemplarily, a convolutional kernel size of each filter in the first convolutional layer 61 is 1×1, and a convolutional kernel size of each filter in the third convolutional layer 67 is 1×1. The input features 701 of the first convolutional layer 61 and the output features of the first path 71 are added to serve as output features 702 of the network block 7.

As described above, in the network block 7 shown in FIG. 7, the second convolutional layer 64 performs grouped convolutions of different receptive field sizes. In addition, two 1×1 pointwise convolutions of the first convolutional layer 61 and the third convolutional layer 67 are grouped, and a grouping rearrangement operation is added, cross-channel calculation amount of the convolutional operations is further reduced, meanwhile feature representation capability of the network block 7 is also maintained.

The network blocks of a convolutional neural network according to an embodiment of the present disclosure are described above with reference to FIGS. 3A to 7. The convolutional neural network according to an embodiment of the present disclosure may be mainly composed of stacking of at least one type of the first network block, the second network block, the third network block, the fourth network block, the fifth network block, the sixth network block and the seventh network block described above. For example, a convolutional neural network model is mainly composed of 16 network blocks, separately belonging to several stages (e.g., 3 stages) of the network, each time the feature map undergoes a stage, the space size is reduced by half and the number of channels is doubled. In addition, it is also possible to obtain other models with arbitrary complexity by simply scaling the number of channels in each layer. In a network block, the more the number of groups in the convolutional operation is, the lower the computational amount is. This means that when a total computational amount is fixed, a larger grouping number can allow more channels, which facilitates more information being coded by the convolutional neural network and improving recognition ability of the convolutional neural network model. In addition, because the grouping rearrangement operation is differentiable, it may be embedded in the network structure to realize end-to-end learning.

The image processing method according to an embodiment of the present disclosure has been described above with reference to the drawings, especially the network block of a convolutional neural network in an image processing method according to an embodiment of the present disclosure has been described with emphasis. Hereinafter, an image processing apparatus that performs this image processing method will be further described.

Figure 8:
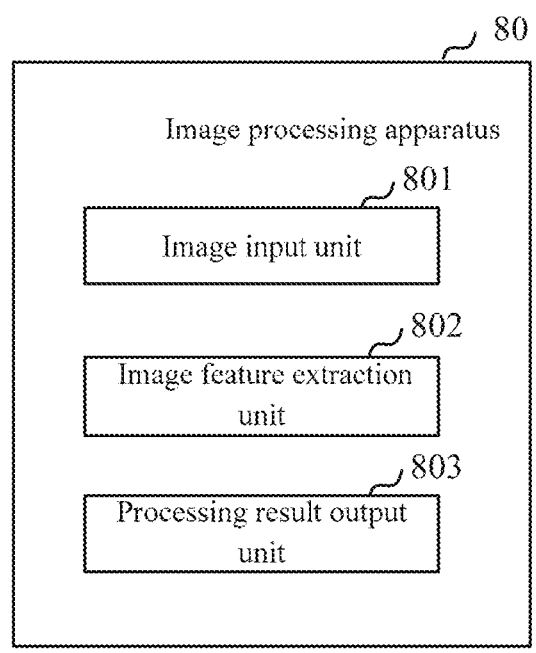
FIG. 8 is a block diagram illustrating an image processing apparatus according to an embodiment of the present disclosure.

FIG. 8 is a block diagram illustrating an image processing apparatus according to an embodiment of the present disclosure. The image processing apparatus 80 according to an embodiment of the present disclosure shown in FIG. 8 may be used to execute an image processing method according to an embodiment of the present disclosure as shown in FIG. 1. As shown in FIG. 8, the image processing apparatus 80 according to an embodiment of the present disclosure comprises an image input unit 801, an image feature extraction unit 802 and a processing result output unit 803.

Specifically, the image input unit 801 is configured to receive the input image via the input layer. Schematically, the image input unit 801 may be physically separated from the image feature extraction unit 802 and the processing result output unit 803 and the like in terms of position, and the image input unit 801 sends the input image to the other units in the image processing apparatus 80 in a wired or wireless manner. Alternatively, the image input unit 801 may be physically located in the same place or even within the same housing together with the other units or components in the image processing apparatus 80, and the other units or components in the image processing apparatus 80 receive, via the internal bus, the image sent by the image input unit 801.

In an embodiment of the present disclosure, the image processing apparatus 80 shown in FIG. 8 may further comprise an image acquisition unit (not shown) configured to acquire the input image. The image input unit 801 is specifically configured to receive the input image acquired by the image acquisition unit via the input layer. The image acquisition unit may be a camera and specifically configured to acquire an image to be processed. In another embodiment of the present disclosure, the image acquisition unit is specifically configured to receive the image to be processed in a wired or wireless manner, for example, receive the image to be processed sent by the image acquisition device or other device. In another embodiment of the present disclosure, the image acquisition unit is specifically configured to obtain a pre-stored image to be processed from a memory.

The image feature extraction unit 802 is configured to extract image features of the input image via the intermediate layer. The intermediate layer may include a plurality of cascaded sub-layers, including but not limited to a convolutional layer, a pooling layer, an activation layer, and the like.

The processing result output unit 803 is configured to output processing results for the input image via the output layer. The output layer outputs the results after processing such as global pooling, full connection, and the like have been performed.

In addition, the image processing apparatus 80 according to an embodiment of the present disclosure is not limited to performing target classification in an image, but also includes detection, segmentation of a target object, motion prediction of a target object, similarity comparison of a target object, and the like.

Figure 9:
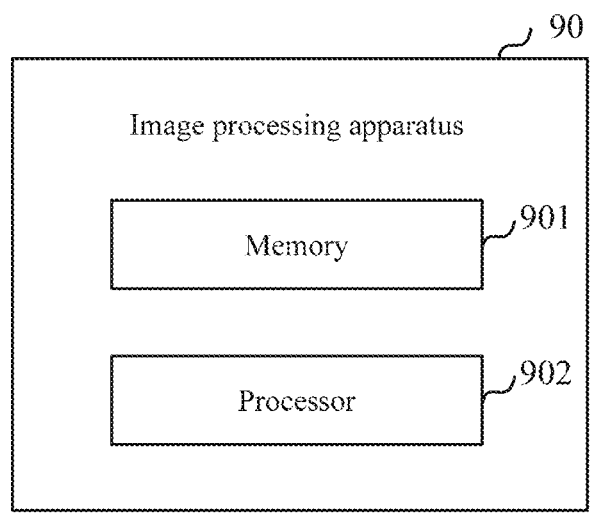
FIG. 9 is a hardware block diagram illustrating an image processing apparatus according to an embodiment of the present disclosure.

FIG. 9 is a hardware block diagram illustrating an image processing apparatus according to an embodiment of the present disclosure. As shown in FIG. 9, an image processing apparatus 90 according to an embodiment of the present disclosure includes a memory 901 and a processor 902. The respective components in the image processing apparatus 90 are interconnected by a bus system and/or other forms of connection mechanisms (not shown).

The memory 901 is configured to store computer-readable instructions. Specifically, the memory 901 may include one or more computer program products, the computer program product may include various forms of computer-readable storage medium, such as volatile memory and/or non-volatile memory. The volatile memory may include, for example, random access memory (RAM) and/or cache. The non-volatile memory may include, for example, read only memory (ROM), hard disk, and flash memory.

The processor 902 may be a central processing unit (CPU), a graphical processing unit (GPU), or other forms of processing unit having data processing capability and/or instruction executing capability and also capable of controlling other components in the image processing apparatus 90 to execute intended functions. In an embodiment of the present disclosure, the processor 902 is configured to execute the computer-readable instructions stored in the memory 901 so that the image processing apparatus 90 executes a neural network-based image processing method. The image processing method is the same as that described with reference to FIG. 1, and repeated description thereof will be omitted herein.

It is to be noted that, since a convolutional neural network model that performs group pointwise convolution and channel-by-channel convolution is utilized in the image processing apparatus according to an embodiment of the present disclosure, the image processing apparatus according to an embodiment of the present disclosure may be electronic devices with limited computing capability, such as a smartphone, a tablet, and a wearable electronic device.

In addition, it should be understood that, the components and structures of the image processing apparatus 90 shown in FIG. 9 are merely exemplary, rather than limitative. The image processing apparatus 90 may also have other components and structures as needed, for example, an image capture device and an output device, etc. (not shown). The image capture device may be used to acquire a to-be-processed image for image processing and store the captured image in the memory 901 for use by other components. Of course, the image to be processed may also be acquired by using other image acquisition devices, and the acquired image may be sent to the image processing apparatus 90, and the image processing apparatus 90 may store the received image in the memory 901. The output device may output various types of information such as image information and image processing results to the outside (e.g., the user). The output device may include one or more of a display, a speaker, a projector, a network card, or the like.

Figure 10:
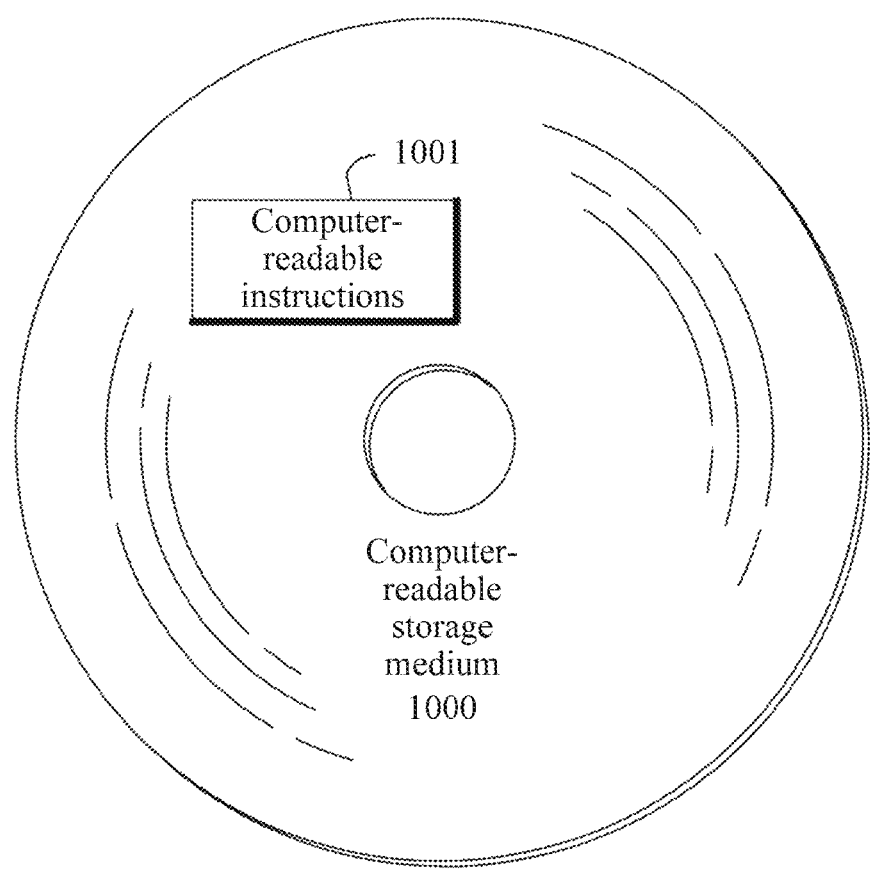
FIG. 10 is a schematic diagram illustrating a computer-readable storage medium according to an embodiment of the present disclosure.

FIG. 10 is a schematic diagram illustrating a computer-readable storage medium according to an embodiment of the present disclosure. As shown in FIG. 10, a computer-readable storage medium 1000 according to an embodiment of the present disclosure has computer-readable instructions 1001 stored thereon. When the computer-readable instructions 1001 are executed by a processor, an image processing method according to an embodiment of the present disclosure described with reference to the above drawings is executed.

According to an embodiment of the present disclosure, a computer program is further provided. The computer program may be stored on a cloud or a local storage medium. When the computer program is executed by a computer or a processor, it is configured to execute the respective steps of the image processing method according to an embodiment of the present disclosure, and to implement the corresponding modules in the image processing apparatus according to an embodiment of the present disclosure.

The neural network-based image processing method and apparatus, and the computer-readable storage medium according to the embodiments of the present disclosure have been described above with reference to the accompanying drawings. In the neural network-based image processing method and apparatus, an ordinary convolutional operation is decomposed into grouped pointwise convolution and channel-by-channel convolution, that is, the channel-by-channel convolution reduces complexity at which convolutional operations extract spatial features, and grouping is carried out by pointwise convolution, the grouping rearrangement layer is introduced to implement feature information exchange between respective groups, representation ability and recognition accuracy of the convolutional neural network model that performs grouped convolution are improved. Besides, by introducing different filters with different convolutional kernel sizes in different groups, it is achieved that different groups have different receptive field sizes, and the grouping rearrangement layer implements information exchange between respective groups having different receptive field sizes, therefore presentation capability and recognition accuracy of the convolutional neural network model that performs grouped convolution are improved.

The terms "first," "second," and "third," etc. in the specification and claims of the present disclosure and drawings are used to distinguish different objects and not to describe a particular sequence.

As will be appreciated by a person of ordinary skill in the art, units and algorithm steps described in combination with the embodiments disclosed herein can be implemented by way of electronic hardware, computer software, or a combination of the two. These functions are to be executed by hardware manner or software manner depending upon the particular application of the technique process and design constraints. A person skilled in the art can use different methods to achieve the described functions with respect to each specific application, but such implementation should not be construed as going beyond the scope of the present disclosure.

Basic principles of the present disclosure have been described above in connection with specific embodiments, but it is to be noted that the merits, advantages, effects etc. mentioned in the present disclosure are merely illustrative, not restrictive, and these merits, advantages, effects etc.

cannot be considered as must be provided by respective embodiments of the present disclosure. In addition, specific details disclosed in the above are for illustrative purposes only and are intended to facilitate understanding, not restrictive, and the foregoing details are not to be construed as limiting that the present disclosure must be implemented with the forgoing specific details.

Block diagrams of the device, apparatus, equipment, system involved in the present disclosure are by way of example only and are not intended to request or imply that connection, arrangement, and configuration must be performed in the manner shown in the block diagrams. As will be appreciated by a person skilled in the art, such device, apparatus, equipment, system may be connected, arranged, and configured in any manner. Words such as "including", "comprising", "having" and the like are open words that refer to "including but not limited to", they can be used interchangeably. Words "or" and "and" used here refer to "and/or", they can be used interchangeably, unless the context clearly dictates otherwise. The word "such as" used here refers to "such as but not limited to", and they may be used interchangeably.

In addition, as used herein, "or" contained in item enumeration starting with the term "at least one" refers to separated enumeration, for example, an enumeration of "at least one of A, B or C" means A or B or C, or AB or AC or BC, or ABC (i.e., A and B and C). In addition, the phrase "exemplary" does not mean that the described example is preferred or better than other examples.

It is also to be noted that, in the system and method of the present disclosure, components or steps may be decomposed and/or recombined. These decomposition and/or recombination shall be considered as equivalent solutions of the present disclosure.

Various changes, substitutions and alterations can be made herein without departing from the technology of the teachings as defined by the appended claims. Moreover, the scope of the present disclosure is not intended to be limited to the particular aspects of the process, machine, manufacture, composition of matter, means, methods and steps described in the specification. As a person of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

The preceding description of the disclosed aspects is provided to enable a person skilled in the art to make or use the present disclosure. Various modifications to these aspects will be readily apparent to a person skilled in the art, and the generic principles defined herein may be applied to other aspects without departing from the scope of the present disclosure. Thus, the present disclosure is not intended to be limited to the aspects shown herein but is to be accorded the widest scope consistent with the principles and novel features disclosed herein.

The foregoing description has been presented for purposes of illustration and description. Furthermore, the description is not intended to limit embodiments of the present disclosure to the form disclosed herein. Although a number of exemplary aspects and embodiments have been discussed above, a person of skill in the art will recognize certain variations, modifications, permutations, additions, and sub-combinations thereof

What is claimed is:

1. An image processing method for processing an input image using a convolutional neural network system that includes an input layer, an intermediate layer and an output layer, the image processing method comprising:
    receiving the input image via the input layer;
    extracting image features of the input image via the intermediate layer; and
    outputting processing results for the input image via the output layer,
    wherein the intermediate layer includes at least one network block, and each of the at least one network block includes a first convolutional layer, a first grouping rearrangement layer and a second convolutional layer that are cascaded, and
    wherein the first convolutional layer includes M filters that are divided into N first filter groups, the second convolutional layer includes P filters that are divided into Q second filter groups,
    the first convolutional layer receives N first feature map groups that include L first feature maps, the N first filter groups and the N first feature map groups correspond to each other one-to-one, each first filter group of the N first filter groups performs convolution on a corresponding one of the first feature map groups, and the first convolutional layer generates M second feature maps,
    the first grouping rearrangement layer divides the M second feature maps into Q second feature map groups each of which includes at least one of the second feature maps outputted by each first filter group of the N first filter groups, and
    the second convolutional layer receives the Q second feature map groups, the Q second filter groups and the Q second feature map groups correspond to each other one-to-one, and each second filter group of the Q second filter groups performs convolution on a corresponding one of the second feature map groups, and the second convolutional layer generates P third feature maps.

2. The image processing method according to claim 1, wherein each of the at least one network block includes a first path and a second path, the first path includes the first convolutional layer, the first grouping rearrangement layer, the second convolutional layer and a third convolutional layer that are cascaded, the second path is a path for linking input features of the first convolutional layer in the first path and output features of the last convolutional layer in the first path,
    the third convolutional layer includes R filters that are divided into S third filter groups, the third convolutional layer receives S third feature map groups that include the P third feature maps, the S third filter groups and the S third feature map groups correspond to each other one-to-one, and each third filter group of the S third filter groups performs convolution on a corresponding one of the third feature map groups, and the third convolutional layer generates R fourth feature maps as output features of the first path.

3. The image processing method according to claim 2, wherein the input features are the N first feature map groups, and a convolutional kernel size of each filter in the first convolutional layer is 1×1,
    a convolutional kernel size of each filter in the second convolutional layer is 3×3, and each filter in the second convolutional layer performs convolution with a step size of one on a second feature map of one channel in one corresponding second feature map group among the Q second feature map groups, so as to generate the P third feature maps, a convolutional kernel size of each filter in the S third filter groups is 1×1, the input features and the output features of the first path are added to serve as output features of each of the at least one network block.

4. The image processing method according to claim 2, wherein the input features are the N first feature map groups, and a convolutional kernel size of each filter in the first convolutional layer is 1×1, a convolutional kernel size of each filter in the second convolutional layer is 3×3, and each filter in the second convolutional layer performs convolution with a step size of t on a second feature map of one channel in one corresponding second feature map group among the Q second feature map groups, so as to generate the P third feature maps, t is an integer greater than one, a convolutional kernel size of each filter in the S third filter groups is 1×1, the second path includes an average pooling layer having a size of u×u, and the average pooling layer performs an average pooling with a step length of t on the input features, and generates pooled input features, u is an integer greater than one, the pooled input features and the output features of the first path are concatenated in a channel dimension as the output features of each of the at least one network block.

5. The image processing method according to claim 2, wherein each of the at least one network block further includes a second grouping rearrangement layer, and the second grouping rearrangement layer divides the R fourth feature maps into T fourth feature map groups.

6. The image processing method according to claim 1, wherein each of the at least one network block includes a first path and a second path, the first path includes the first convolutional layer, the first grouping rearrangement layer and the second convolutional layer that are cascaded, the second path is a path for linking input features of the first convolutional layer in the first path and output features of the last convolutional layer in the first path, a convolutional kernel size of each filter in the first convolutional layer is 1×n, and a convolutional kernel size of each filter in the second convolutional layer is n×1; or, a convolutional kernel size of each filter in the first convolutional layer is n×1, and a convolutional kernel size of each filter in the second convolutional layer is 1×n, the input features are the N first feature map groups, and the output features of the first path are the P third feature maps generated by the second convolutional layer, the input features and the output features of the first path are added to serve as the output features of each of the at least one network block.

7. The image processing method according to claim 1, wherein the first grouping rearrangement layer divides the M second feature maps equally into the Q second feature map groups.

8. The image processing method according to claim 1, wherein each of the at least one network block further includes a third convolutional layer, the first convolutional layer includes M filters that are divided into N first filter groups, the first convolutional layer receives N first feature map groups that include L first feature maps, and the N first filter groups and the N first feature map groups correspond to each other one-to-one, and each first filter group of the N first filter groups performs convolution on a corresponding one of the first feature map groups, and the first convolutional layer generates M second feature maps that are divided into Q second feature map groups, the second convolutional layer includes P filters that are divided into Q second filter groups, and the second convolutional layer receives the Q second feature map groups, the Q second filter groups and the Q second feature map groups correspond to each other one-to-one, each second filter group of the Q second filter groups performs convolution on a corresponding one of the second feature map groups, the second convolutional layer generates P third feature maps, the first grouping rearrangement layer divides the P third feature maps into S third feature map groups, and each third feature map group of the S third feature map groups includes at least one of the third feature maps outputted by each second filter group of the Q second filter groups, the third convolutional layer includes R filters that are divided into S third filter groups, and the third convolutional layer receives the S third feature map groups, the S third filter groups and the S third feature map groups correspond to each other one-to-one, and each third filter group of the S third filter groups performs convolution on a corresponding one of the third feature map groups, the third convolutional layer generates R fourth feature maps.

9. The image processing method according to claim 8, wherein each of the at least one network block includes a first path and a second path, the first path includes the first convolutional layer, the second convolutional layer, the first grouping rearrangement layer and a third convolutional layer that are cascaded, the second path is a path for linking input features of the first convolutional layer in the first path and output features of the last convolutional layer in the first path, the input features and the output features of the first path are added to serve as output features of each of the at least one network block.

10. The image processing method according to claim 8, wherein convolutional kernel sizes of the filters in the same group in the second convolutional layer are the same, and convolutional kernel sizes of the filters in different groups in the second convolutional layer are different.

11. The image processing method according to claim 8, wherein a convolutional kernel size of each filter in the first convolutional layer is 1×1, and a convolutional kernel size of each filter in the third convolutional layer is 1×1.

12. The image processing method according to claim 8, wherein the first grouping rearrangement layer divides the P third feature maps equally into the S third feature graph groups.

13. An image processing apparatus, comprising:
a memory configured to store computer-readable instructions; and
a processor configured to execute the computer-readable instructions to cause the image processing apparatus to perform an image processing method, said method comprising:

receiving the input image via the input layer;

extracting image features of the input image via the intermediate layer; and outputting processing results for the input image via the output layer, wherein the intermediate layer includes at least one network block each of which includes a first convolutional layer, a first grouping rearrangement layer and a second convolutional layer that are cascaded, and wherein the first convolutional layer includes M filters that are divided into N first filter groups, the second convolutional layer includes P filters that are divided into Q second filter groups, the first convolutional layer receives N first feature map groups that include L first feature maps, the N first filter groups and the N first feature map groups correspond to each other one-to-one, each first filter group of the N first filter groups performs convolution on a corresponding one of the first feature map groups, and the first convolutional layer generates M second feature maps, the first grouping rearrangement layer divides the M second feature maps into Q second feature map groups each of which includes at least one of the second feature maps outputted by each first filter group of the N first filter groups, and the second convolutional layer receives the Q second feature map groups, the Q second filter groups and the Q second feature map groups correspond to each other one-to-one, and each second filter group of the Q second filter groups performs convolution on a corresponding one of the second feature map groups, and the second convolutional layer generates P third feature maps.

14. The image processing apparatus according to claim 13, wherein each of the at least one network block includes a first path and a second path, the first path includes the first convolutional layer, the first grouping rearrangement layer, the second convolutional layer and a third convolutional layer that are cascaded, the second path is a path for linking input features of the first convolutional layer in the first path and output features of the last convolutional layer in the first path, the third convolutional layer includes R filters that are divided into S third filter groups, the third convolutional layer receives S third feature map groups that include the P third feature maps, the S third filter groups and the S third feature map groups correspond to each other one-to-one, and each third filter group of the S third filter groups performs convolution on a corresponding one of the third feature map groups, and the third convolutional layer generates R fourth feature maps as output features of the first path.

15. The image processing apparatus according to claim 13, wherein each of the at least one network block includes a first path and a second path, the first path includes the first convolutional layer, the first grouping rearrangement layer and the second convolutional layer that are cascaded, the second path is a path for linking input features of the first convolutional layer in the first path and output features of the last convolutional layer in the first path, a convolutional kernel size of each filter in the first convolutional layer is 1×n, and a convolutional kernel size of each filter in the second convolutional layer is n×1; or, a convolutional kernel size of each filter in the first convolutional layer is n×1, and a convolutional kernel size of each filter in the second convolutional layer is 1×n, the input features are the N first feature map groups, and the output features of the first path are the P third feature maps generated by the second convolutional layer, the input features and the output features of the first path are added to serve as the output features of each of the at least one network block.

16. The image processing apparatus according to claim 13, wherein each of the at least one network block further includes a third convolutional layer, the first convolutional layer includes M filters that are divided into N first filter groups, the first convolutional layer receives N first feature map groups that include L first feature maps, and the N first filter groups and the N first feature map groups correspond to each other one-to-one, and each first filter group of the N first filter groups performs convolution on a corresponding one of the first feature map groups, and the first convolutional layer generates M second feature maps that are divided into Q second feature map groups, the second convolutional layer includes P filters that are divided into Q second filter groups, and the second convolutional layer receives the Q second feature map groups, the Q second filter groups and the Q second feature map groups correspond to each other one-to-one, each second filter group of the Q second filter groups performs convolution on a corresponding one of the second feature map groups, the second convolutional layer generates P third feature maps, the first grouping rearrangement layer divides the P third feature maps into S third feature map groups, and each third feature map group of the S third feature map groups includes at least one of the third feature maps outputted by each second filter group of the Q second filter groups, the third convolutional layer includes R filters that are divided into S third filter groups, and the third convolutional layer receives the S third feature map groups, the S third filter groups and the S third feature map groups correspond to each other one-to-one, and each third filter group of the S third filter groups performs convolution on a corresponding one of the third feature map groups, the third convolutional layer generates R fourth feature maps.

17. The image processing apparatus according to claim 16, wherein each of the at least one network block includes a first path and a second path, the first path includes the first convolutional layer, the second convolutional layer, the first grouping rearrangement layer and a third convolutional layer that are cascaded, the second path is a path for linking input features of the first convolutional layer in the first path and output features of the last convolutional layer in the first path, the input features and the output features of the first path are added to serve as output features of each of the at least one network block.

18. The image processing apparatus according to claim 16, wherein convolutional kernel sizes of the filters in the same group in the second convolutional layer are the same, and convolutional kernel sizes of the filters in different groups in the second convolutional layer are different.

19. A computer-readable storage medium for storing computer-readable instructions capable of, when being executed by a computer, causing the computer to perform an image processing method comprising:

receiving the input image via the input layer;

extracting image features of the input image via the intermediate layer; and outputting processing results for the input image via the output layer, wherein the intermediate layer includes at least one network block each of which includes a first convolutional layer, a first grouping rearrangement layer and a second convolutional layer that are cascaded, and wherein the first convolutional layer includes M filters that are divided into N first filter groups, the second convolutional layer includes P filters that are divided into Q second filter groups, the first convolutional layer receives N first feature map groups that include L first feature maps, the N first filter groups and the N first feature map groups correspond to each other one-to-one, each first filter group of the N first filter groups performs convolution on a corresponding one of the first feature map groups, and the first convolutional layer generates M second feature maps, the first grouping rearrangement layer divides the M second feature maps into Q second feature map groups each of which includes at least one of the second feature maps outputted by each first filter group of the N first filter groups, and the second convolutional layer receives the Q second feature map groups, the Q second filter groups and the Q second feature map groups correspond to each other one-to-one, and each second filter group of the Q second filter groups performs convolution on a corresponding one of the second feature map groups, and the second convolutional layer generates P third feature maps.

20. The computer-readable storage medium according to claim 19, wherein each of the at least one network block includes a first convolutional layer, a second convolutional layer, a first grouping rearrangement layer and a third convolutional layer that are cascaded, the first convolutional layer includes M filters that are divided into N first filter groups, the first convolutional layer receives N first feature map groups that include L first feature maps, and the N first filter groups and the N first feature map groups correspond to each other one-to-one, and each first filter group of the N first filter groups performs convolution on a corresponding one of the first feature map groups, and the first convolutional layer generates M second feature maps that are divided into Q second feature map groups, the second convolutional layer includes P filters that are divided into Q second filter groups, and the second convolutional layer receives the Q second feature map groups, the Q second filter groups and the Q second feature map groups correspond to each other one-to-one, each second filter group of the Q second filter groups performs convolution on a corresponding one of the second feature map groups, the second convolutional layer generates P third feature maps, the first grouping rearrangement layer divides the P third feature maps into S third feature map groups, and each third feature map group of the S third feature map groups includes at least one of the third feature maps outputted by each second filter group of the Q second filter groups, the third convolutional layer includes R filters that are divided into S third filter groups, and the third convolutional layer receives the S third feature map groups, the S third filter groups and the S third feature map groups correspond to each other one-to-one, and each third filter group of the S third filter groups performs convolution on a corresponding one of the third feature map groups, the third convolutional layer generates R fourth feature maps.

\* \* \* \* \*